United States Patent [19]

Rowe et al.

[11] Patent Number: 4,579,561

[45] Date of Patent: Apr. 1, 1986

[54] PROCESS FOR TRICHROMATIC DYEING POLYAMIDE FIBERS

[75] Inventors: Jay E. Rowe, Douglassville; James F. Feeman, Wyomissing, both of Pa.

[73] Assignee: Crompton and Knowles Corporation, New York, N.Y.

[21] Appl. No.: 690,010

[22] Filed: Jan. 9, 1985

Related U.S. Application Data

[63] Continuation-in-part of Ser. No. 575,573, Jan. 31, 1984, abandoned.

[51] Int. Cl.$^4$ .............................................. C09B 1/34
[52] U.S. Cl. .......................................... 8/641; 8/643; 8/676; 8/681; 8/683; 8/687; 8/924; 8/929; 8/917
[58] Field of Search ................... 8/641, 643, 676, 681, 8/683, 687

[56] References Cited

U.S. PATENT DOCUMENTS

| 3,802,836 | 4/1974 | Speck | 8/26 |
| 4,402,704 | 9/1983 | Raisin et al. | 8/641 |
| 4,445,905 | 5/1984 | Schaetzer et al. | 8/641 |

FOREIGN PATENT DOCUMENTS

| 17119 | 7/1983 | Australia. |
| 127579 | 12/1984 | European Pat. Off.. |
| 1551939 | 9/1975 | United Kingdom. |
| 1586411 | 3/1981 | United Kingdom. |

Primary Examiner—A. Lionel Clingman
Attorney, Agent, or Firm—Synnestvedt & Lechner

[57] ABSTRACT

A trichromatic dye system for the dyeing of synthetic polyamide fibers, the system including an acid red dye component, an acid blue dye component, and an acid yellow dye component, each of the dye components being compatible from a performance standpoint.

26 Claims, No Drawings

PROCESS FOR TRICHROMATIC DYEING POLYAMIDE FIBERS

This is a continuation-in-part of co-pending application Ser. No. 06/575,573, filed on Jan. 31, 1984, now abandoned.

This invention relates to a new combination dye system for the dyeing of synthetic polyamide fibers, and particularly synthetic polyamide carpeting, that enables various hues and shades to be obtained by varying the concentration of two or three different colored dye components—one being a red dye component, one being a blue dye component, and one being a yellow dye component. Such a system is sometimes referred to as a trichromatic dye system.

In such a compound dye system, in addition to imparting the usual desirable fastness properties (such as wet fastness, light fastness, and stability to deleterious atmospheric gases) to the dyeings made therewith, it is essential that the various dye components used in the system be compatible from a performance standpoint. Specifically, the color components should possess substantially the same aqueous solution stability, substantially the same dyeing rate, and substantially the same migration characteristics, so as to provide uniform strike, exhaustion, and build-up under the particular time and temperature conditions encountered in the dyeing operation (usually from room temperature to 100° C.) so that the desired hue will build up uniformly "on tone" and enable the dyer to have good control over the dyeing process at all stages thereof.

As used in this application, and unless a contra intent is clearly evident from the context, the term "dyeing" is used in its broadest sense to cover the coloring of the fiber by the application of a color component from an aqueous solution and includes coloration by printing with aqueous print pastes as well as by conventional dyeing techniques. In addition, the terms "yellow dye" or "yellow color component" are also used to include compounds that are commercially designated as yellow dyes and as orange dyes.

Of the thousands of known acid dyes that are capable of dyeing synthetic polyamide fibers, relatively few dye combinations have the requisite compatibility from a performance standpoint to enable them to be used effectively as trichromatic systems for dyeing synthetic polyamide fibers from aqueous dye baths, so as to provide uniform strike, build-up, and exhaustion of color during the dyeing operation and to reproduce repetitively uniform dyeings. The finding and selecting of compatible red, yellow, and blue dyes is also greatly aggravated because, under the present state of the art, persons skilled in the art cannot with certainty predict the degree to which structural alterations of a dye can influence a dye's performance, nor can they predict with certainty how an incompatible dye should be structurally modified to render it compatible with the other color component or components of the system.

It is a primary object of the present invention to provide a new system of compatible dyes that includes an acid red dye component, an acid blue dye component, and an acid yellow dye component that can be used in rapid, continuous dyeing applications where readily controlled dyeing is desired, such as in continuous printing, foam dyeing, and spray dyeing of carpets, and particularly in applications where high-speed, computer-controlled equipment is employed.

It is a further object of the invention to provide such a system that can also be used in exhaust dyeing, such as in Becks.

Still another objective of the invention is to provide a trichromatic system that utilizes a dye mixture that has not heretofore been used.

These and other objects of the invention are accomplished by a process for dyeing synthetic polyamide textile fibers by contacting said fibers with an aqueous solution containing a plurality of dyes, and in which one of the dyes in said solution is a red acid dye having the structure (I):

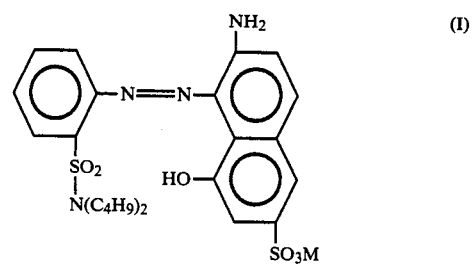

wherein M is —Na, —K, —Li or —N(R$_5$)$_4$, and where R$_5$ is —H or

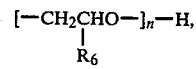

and R$_6$ is —H, —CH$_3$ or —CH$_2$CH$_3$, and n is 1, 2, 3 or 4; said solution also contains at least one dye selected from a compatible acid blue dye, a compatible acid yellow dye, or a mixture of said blue and yellow dyes; said blue dye having the structure (II):

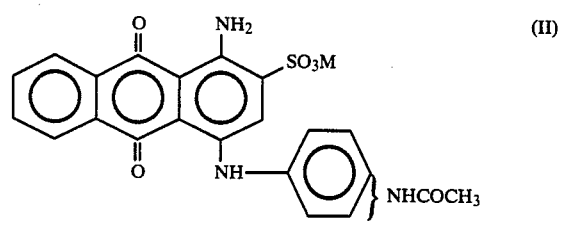

wherein M in the Structure II dyes has the same meaning as in Structure I above; and said yellow dye being at least one of the acid yellow dyes having the following structures (III) to (VIII):

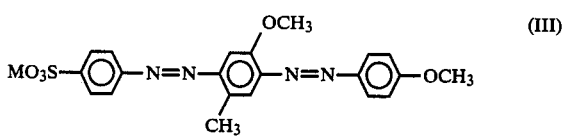

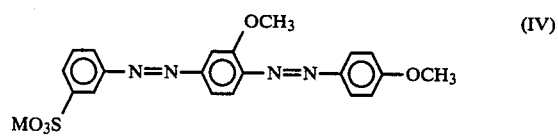

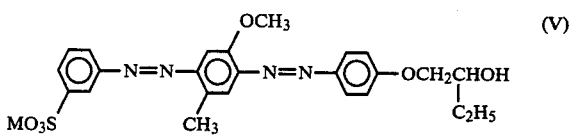

-continued

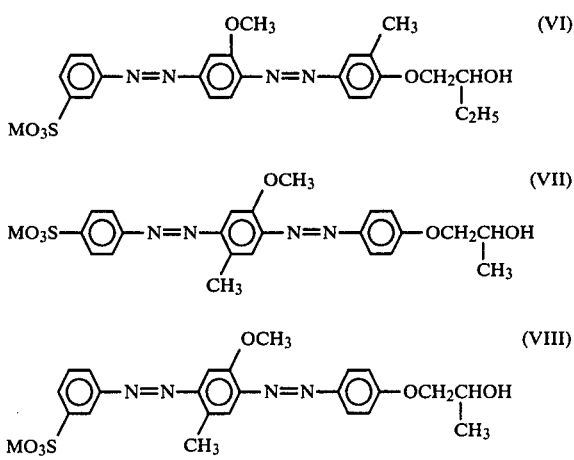

wherein M in each of said yellow dye structures has the same meaning as above in Structure I.

Trichromatic dyeing systems are known, and some of them use both some of the above-specified yellow dyes and some of the above-specified blue dyes for the yellow and blue components.

The above-specified red dye of Structure I belongs to a family of red dyes that was known since at least 1935 (See British Pat. No. 465,955), and it has been known in German Pat. OLS No. 27 24 079 to be a red dye for natural and synthetic polyamide fibers; however, its compatibility with the above-specified Structure II blue and Structure III-VIII yellow dyes has not heretofore been recognized or demonstrated. Of the various dibutyl derivatives of the Structure I dyes, the normal dibutyl derivative, for reasons of economy and availability, is preferred. The secondary and isodibutyl derivatives are available but are more expensive than the n-dibutyl derivative. The Structure I red dye—particularly the n-dibutyl derivative—is characterized by superior light fastness for a red dye on nylon and is more compatible with the above-specified blue and yellow dye components of Structures II and III-VIII than it is with many other commonly used blue and yellow dyes that are closely related.

For reasons of economy, fastness to ozone and other atmospheric gases, and availability, it is preferred to employ as the blue dye component a dye having the Structure IIa:

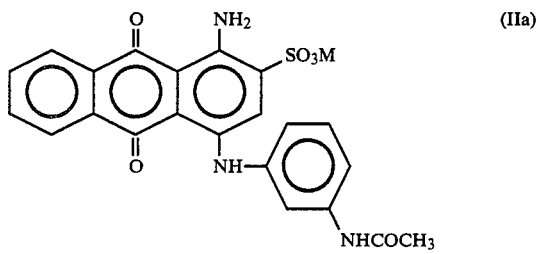

However, good results are also obtained with the Structure IIb dye:

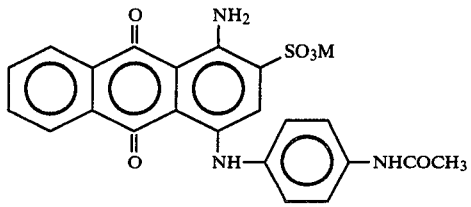

and with mixtures of Structure IIa and IIb dyes.

Also for reasons of economy and ready availability, it is preferred to employ a Structure III, IV or VII dye as the yellow component in the system, according to the invention.

The sodium sulfonates of the dyes of Structures I to VIII are preferred; however, where modified solubility characteristics are desired, the dyes can also be used as the potassium or lithium salts or as salts having the structure $-N(R_5)_4$, wherein $R_5$ is $-H$ or

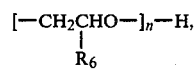

$R_6$ is $-CH_3$ or $-CH_2CH_3$, and n is 1, 2, 3 or 4. Examples are ammonium, alkanolammonium and polyalkanolammonium salts. Suitable alkanolammonium salts include the monoethanolammonium, diethanolammonium and triethanolammonium salts. Ethoxylated, propoxylated and butoxylated derivatives thereof, as well as mixtures of these derivatives, exemplify the polyoxyalkanolammonium salts. Amines from which such salts are derived may be readily prepared by reacting ammonia, mono-, di- or trialkanolamines with ethylene oxide, propylene oxide, butylene oxide or mixtures thereof.

The concentrations of the color components can be varied in a conventional manner in order to develop the desired hue in the dyeing.

The following examples will serve to illustrate the compatibility of the color components used in the trichromatic dye system of this invention and will also illustrate the use of said system in the dyeing of polyamide carpet fibers. In the examples, parts and percentages are by weight and temperatures are in degrees Fahrenheit, unless otherwise stated.

EXAMPLE I (On Tone Build)

Six identical dye baths (identified as A, B, C, D, E and F) were prepared according to the following formulation:

| | | |
|---|---|---|
| Structure I red dye | (n-dibutyl; M = Na) | 0.055 parts |
| Structure IIa blue dye | (M = Na) | 0.010 parts |
| Structure III yellow dye | (M = Na) | 0.040 parts |

The dye solutions were diluted to 400 mls with water and placed in the dye tubes of a tall form Ahiba dyeing machine. The pH of each was adjusted to 5.0±0.1 (using 5 ml monosodiumphosphate solution and acetic acid). The baths were all at room temperature.

Seven 5-gram skeins (identified as skeins A', B', C', D', E', F', and G') of polyamide carpet fiber (DuPont 846 BCF T66 nylon) were wet out in soft water.

Skeins A', B', C', D', E', and F' were simultaneously placed in tubes A, B, C, D, E, and F, and the dyeing machine bath was adjusted to bring the bath temperature to 212° F. at a rate of about 2° to 3° per minute.

Skein A' was removed when the bath temperature reached 120° F.

Skein B' was removed when the bath temperature reached 140° F.

Skein C' was removed when the bath temperature reached 160° F.

Skein D' was removed when the bath temperature reached 180° F.

Skein E' was removed when the bath temperature reached 212° F.

Skein F' was removed after dyeing for 60 minutes at 212° F.

Skein G' was then placed in tube F, run 5 minutes at 212° F.; 5 ml of acetic acid was added, and dyeing continued for 15 minutes, at which time skein G' was removed from the tube.

All skeins were rinsed in cold water and dried.

The color reflectance curves of each of the skeins were measured on an ACS 500 color control system. Each was compared to the A' skein on the DA scale in CIE L*A*b* units. The results were as follows:

| Skein | CIE L*A*b* Units |
|-------|------------------|
| A' | 0.00 |
| B' | −0.26 |
| C' | −0.58 |
| D' | −0.51 |
| E' | 0.27 |
| F' | 1.25 |

In this type of evaluation, the closer the numbers remain to 0.00, the smaller the change in relative coloration. The larger the value, the greater is the relative shade change. Larger positive numbers indicate increasing redness, while negative units indicate a greener shade.

EXAMPLE II

Example I was repeated using 0.06 parts of a yellow dye of Structure IV instead of the Structure III dye. The resulting reflectance values were as follows:

| Skein | CIE L*A*b* Units |
|-------|------------------|
| A' | 0.00 |
| B' | −0.37 |
| C' | −0.02 |
| D' | −0.02 |
| E' | −0.16 |
| F' | −0.29 |

EXAMPLE III

A dyebath was prepared containing the following:

| | | |
|---|---|---|
| Structure I red dye | (n-dibutyl; M = Na) | 2.2 grams |
| Structure IIa blue dye | (M = Na) | 1.0 grams |
| Structure III yellow dye | (M = Na) | 2.5 grams |

In addition, the bath contained 10.0 g of the sodium salt of dioctylsulfosuccinate as a wetting agent, 1.25 g of the tetrasodium salt of ethylenediaminetetraacetic acid as a sequestrant, 5.0 g of an alkyl arylethersulfonate as a levelling agent, and 750 g of a synthetic, acid-hydrating guar gum. The bath was diluted to a total volume of 5.0 liters and the pH adjusted to 6.5 with acetic acid. It was then charged to a Kusters Continuous Application Roll Lab Carpet Dyeing Unit.

A 40-ounce sample of 100% Nylon 6.6 Saxony carpet having a synthetic backing was impregnated with the above-described dye liquor at a running speed equivalent to 5 yards per minute. It was then squeezed out at a squeeze roll pressure of 10 p.s.i. to 400 percent liquor take-up, calculated on the dry weight of the carpet. The sample was then subjected to steam at 212° F. for 6 minutes, rinsed with cold water and dried.

A level-dyed carpet of medium brown shade having excellent fastness to light and atmospheric gases was obtained.

We claim:

1. A process for dyeing natural and synthetic polyamide textile fibers by contacting said fibers with an aqueous solution containing a plurality of dyes, and in which one of the dyes in said solution is a red acid dye having the structure:

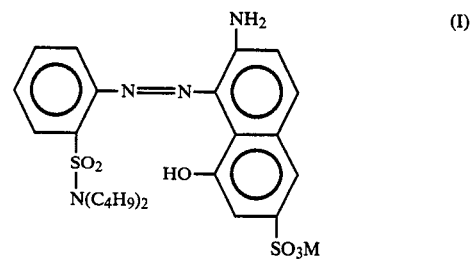

wherein M is —Na, —K, —Li or —N(R$_5$)$_4$, R$_5$ is —H or

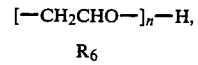

R$_6$ is —H, —CH$_3$ or —CH$_2$CH$_3$, and n is 1, 2, 3, or 4; and wherein the solution also contains at least one dye selected from a compatible acid blue dye, a compatible acid yellow dye, or a mixture of said blue and yellow dyes; said blue dye having the structure:

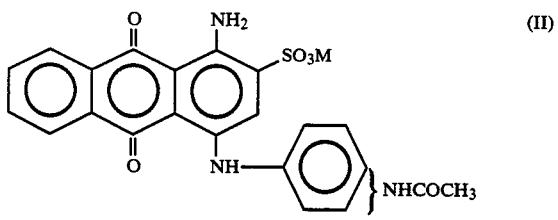

wherein M has the same meaning as above; and said yellow dye being at least one of the acid yellow dyes having the following structures:

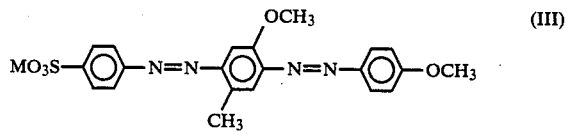

-continued

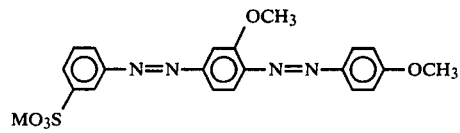 (IV)

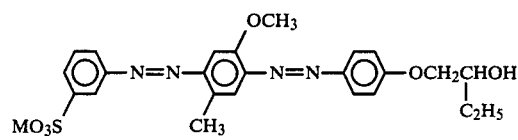 (V)

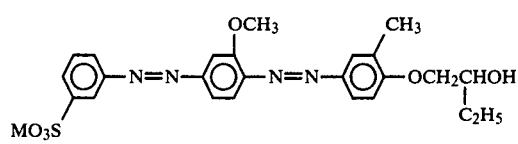 (VI)

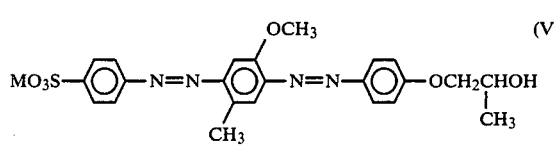 (VII)

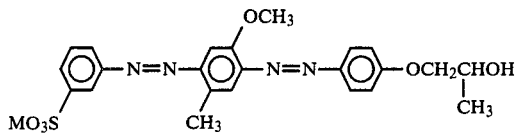 (VIII)

where M in each of said yellow dye structures has the same meaning as above.

2. The process according to claim 1 wherein the red dye is the normal dibutyl derivative.

3. The process according to claim 1 or 2 wherein the acid blue dye has the structure:

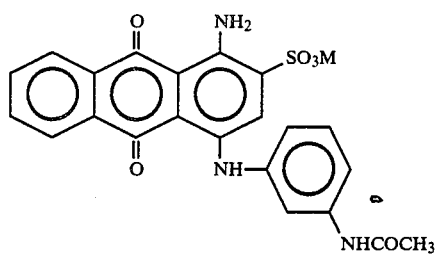 (IIa)

4. The process according to claim 1 or 2 wherein the acid blue dye has the structure:

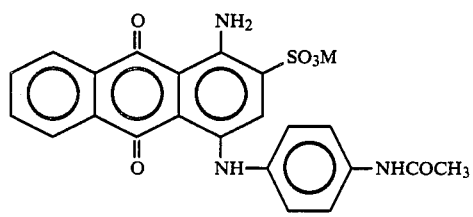 (IIb)

5. The process according to claim 1 or 2 wherein the acid yellow dye has the structure:

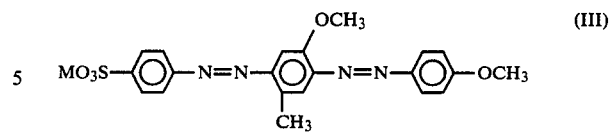 (III)

6. The process according to claim 1 or 2 wherein the acid yellow dye has the structure:

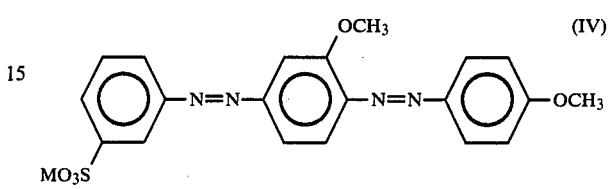 (IV)

7. The process according to claim 1 or 2 wherein the acid yellow dye has the structure:

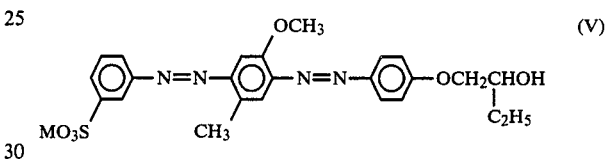 (V)

8. The process according to claim 1 or 2 wherein the acid yellow dye has the structure:

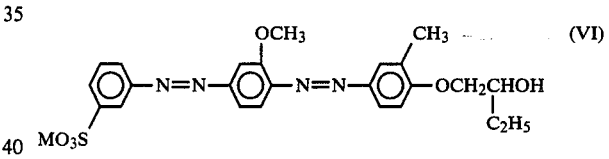 (VI)

9. The process according to claim 1 or 2 wherein the acid yellow dye has the structure:

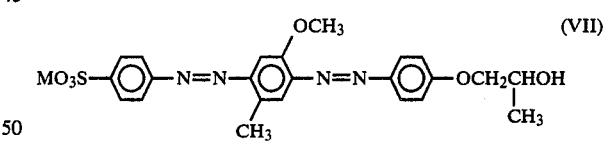 (VII)

10. The process according to claim 1 or 2 wherein the acid yellow dye has the structure:

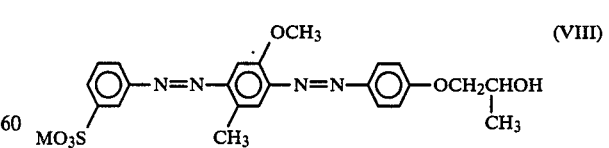 (VIII)

11. The process according to any of claims 1 through 10 wherein M is —Na.

12. An aqueous solution containing a plurality of dyes and wherein one of the dyes in the solution is an acid red dye having the structure:

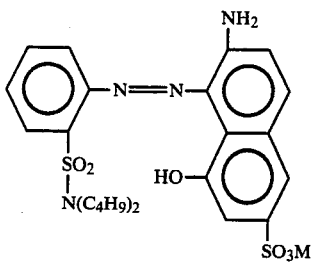
(I)

and wherein the solution also contains at least one dye selected from a compatible acid blue dye, a compatible acid yellow dye, or a mixture of said blue and yellow dyes, said blue dye having the structure:

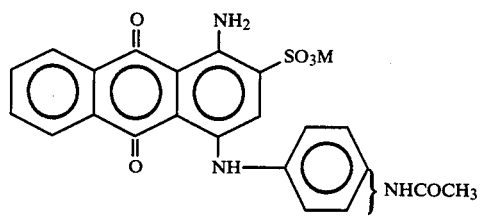
(II)

and said yellow dye having the structure:

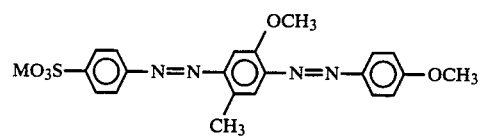
(III)

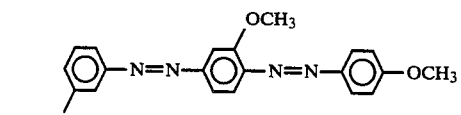
(IV)

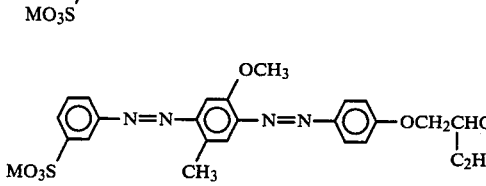
(V)

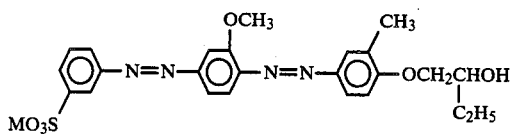
(VI)

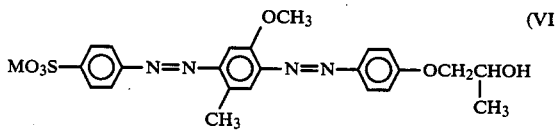
(VII)

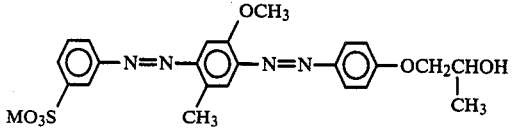
(VIII)

wherein M in each of the foregoing structures is —Na, —K, —Li or —N(R$_5$)$_4$; R$_5$ is —H or $[-CH_2CHO-]_n-H$;
R$_6$ R$_6$ is —H, —CH$_3$ or —CH$_2$CH$_3$; and n is 1, 2, 3 or 4.

13. An aqueous solution according to claim 12 wherein the red dye is the normal dibutyl derivative.

14. An aqueous solution according to claim 12 or 13 wherein the acid blue dye is:

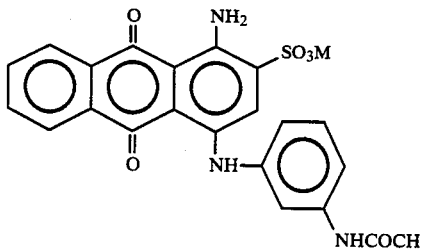
(IIa)

15. An aqueous solution according to claim 12 or 13 wherein the acid blue dye is:

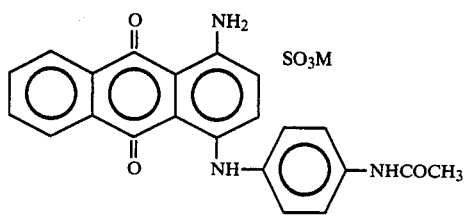
(IIb)

16. An aqueous solution according to claim 12 or 13 wherein the acid yellow dye has the structure:

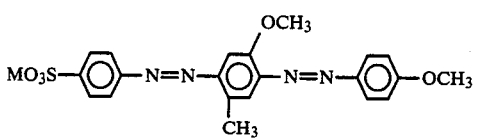
(III)

17. An aqueous solution according to claim 12 or 13 wherein the acid yellow dye has the structure:

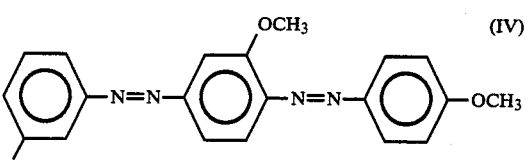
(IV)

18. An aqueous solution according to claim 12 or 13 wherein the acid yellow dye has the structure:

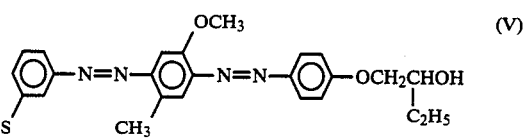
(V)

19. An aqueous solution according to claim 12 or 13 wherein the acid yellow dye has the structure:

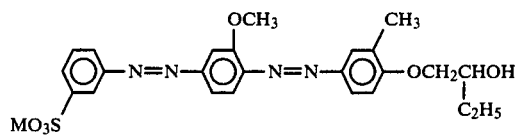

(VI)

20. An aqueous solution according to claim 12 or 13 wherein the acid yellow dye has the structure:

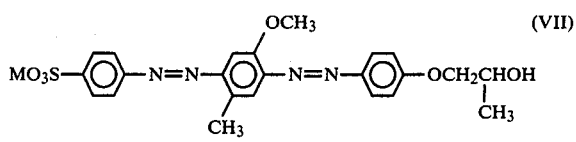

(VII)

21. An aqueous solution according to claim 12 or 13 wherein the acid yellow dye has the structure:

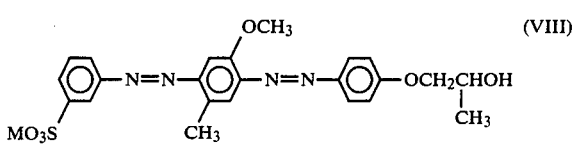

(VIII)

22. An aqueous solution according to claim 12 wherein M is —Na.

23. Polyamide textile fibers dyed by the process of claim 1.

24. Polyamide carpet fibers dyed by the process of claim 1.

25. Polyamide textile fibers dyed with a plurality of dyes, and in which one of the dyes is a red acid dye having the structure:

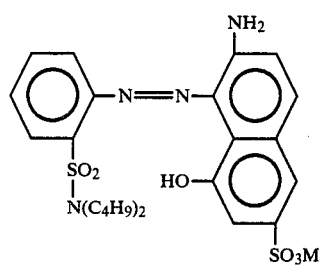

(I)

wherein M is —Na, —K, —Li or —N(R$_5$)$_4$, R$_5$ is —H or

[—CH$_2$CHO—]$_n$—H,
R$_6$

R$_6$ is —H, —CH$_3$ or —CH$_2$CH$_3$, and n is 1, 2, 3, or 4; and wherein the solution also contains at least one dye selected from a compatible acid blue dye, a compatible acid yellow dye, or a mixture of said blue and yellow dyes; said blue dye having the structure:

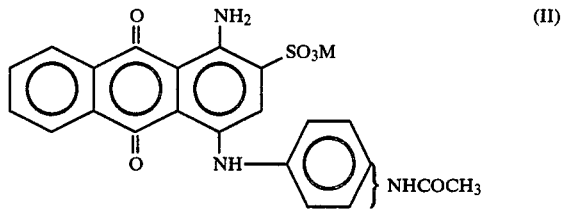

(II)

wherein M has the same meaning as above; and said yellow dye being at least one of the acid yellow dyes having the following structures:

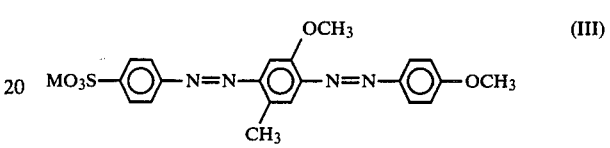

(III)

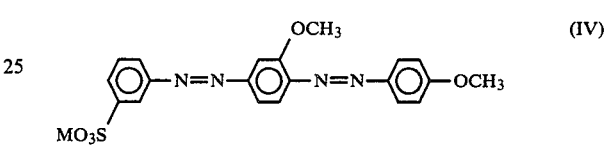

(IV)

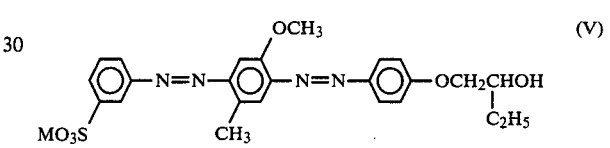

(V)

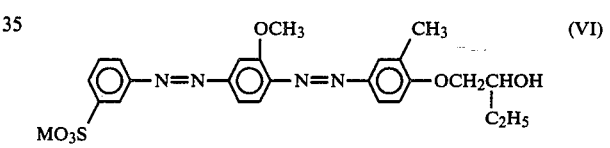

(VI)

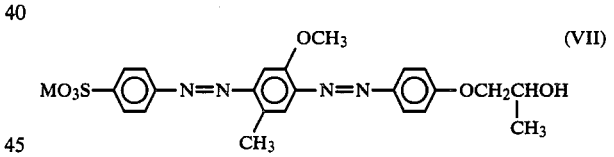

(VII)

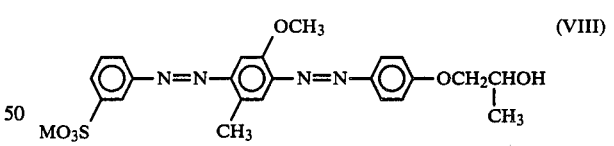

(VIII)

where M in each of said yellow dye structures has the same meaning as above.

26. A dyed fiber according to claim 25 wherein the fiber is a polyamide carpet fiber.

* * * * *